US00RE47085E

(19) United States
(12) Reissued Patent
Newman

(10) Patent Number: US RE47,085 E
(45) Date of Reissued Patent: Oct. 16, 2018

(54) MOUNTING ARM

(71) Applicant: Eureka Mobility, Inc., Odessa, FL (US)

(72) Inventor: David L Newman, Highland Park, IL (US)

(73) Assignee: Eureka Mobility Inc., Odessa, FL (US)

(21) Appl. No.: 14/756,958

(22) Filed: Nov. 2, 2015

Related U.S. Patent Documents

Reissue of:
(64) Patent No.: 7,111,814
Issued: Sep. 26, 2006
Appl. No.: 10/943,708
Filed: Sep. 17, 2004

(51) Int. Cl.

| | |
|---|---|
| ***E04G 3/00*** | (2006.01) |
| ***B60R 11/02*** | (2006.01) |
| ***F16M 11/10*** | (2006.01) |
| ***F16M 11/14*** | (2006.01) |
| ***F16M 11/20*** | (2006.01) |
| ***F16M 11/40*** | (2006.01) |
| ***F16M 13/02*** | (2006.01) |
| *B60R 11/00* | (2006.01) |

(52) U.S. Cl.
CPC ..... *B60R 11/0235* (2013.01); *B60R 11/0211* (2013.01); *B60R 11/0252* (2013.01); *F16M 11/10* (2013.01); *F16M 11/14* (2013.01); *F16M 11/2021* (2013.01); *F16M 11/2078* (2013.01); *F16M 11/40* (2013.01); *F16M 13/02* (2013.01); *B60R 2011/0015* (2013.01); *B60R 2011/0017* (2013.01); *Y10S 248/917* (2013.01)

(58) Field of Classification Search
CPC ..... B60R 11/0235; B60R 11/0252; B60R 11/0211; B60R 2011/0017; B60R 2011/0015; F16M 11/2021; F16M 11/2078; F16M 11/10; F16M 11/14; F16M 13/02; Y10S 248/917
USPC ..... 297/188.01, 188.04, 188.05, 188.06; 224/275, 908; 248/176.1, 176.3, 187.1; 108/44
See application file for complete search history.

(56) References Cited

U.S. PATENT DOCUMENTS

| | | | | |
|---|---|---|---|---|
| 4,792,183 A | | 12/1988 | Townsend, III | |
| 5,184,794 A | * | 2/1993 | Saito | F16L 3/13 248/316.5 |
| 5,370,060 A | * | 12/1994 | Wang | B60N 3/004 108/149 |
| 5,678,741 A | * | 10/1997 | Schieber | 224/275 |

(Continued)

FOREIGN PATENT DOCUMENTS

| | | | |
|---|---|---|---|
| DE | 19943696 | * | 9/1999 |
| DE | 19943696 | | 3/2001 |

(Continued)

OTHER PUBLICATIONS

Brodit AB, Headrest Mount, 810810, Appendix 3, p. 1, 2.

*Primary Examiner* — Kenneth J Whittington

(57) ABSTRACT

The present invention provides for a mounting arm for receiving an electronic component, such as a DVD player that is quickly and easily strapped to the mounting arm and in turn, the mounting arm may be quickly and easily mounted to a support surface, such as a seat back of a vehicle via the mounting means provided by the mounting arm. Apertures may be provided in the mounting arm for receiving rods of a headrest of a vehicle seat for maintaining the mounting arm in a secured position.

30 Claims, 9 Drawing Sheets

(56) References Cited

U.S. PATENT DOCUMENTS

| | | | | |
|---|---|---|---|---|
| 5,813,354 | A * | 9/1998 | Scott | B60N 3/004 108/44 |
| 6,216,927 | B1 | 4/2001 | Merritt | |
| 6,231,017 | B1 * | 5/2001 | Watkins | 248/274.1 |
| 6,315,252 | B1 * | 11/2001 | Schultz | B60R 11/0252 108/44 |
| 6,502,900 | B1 * | 1/2003 | Johnston | 297/188.06 |
| 6,513,691 | B1 * | 2/2003 | Edgerly | 224/537 |
| 6,554,357 | B2 * | 4/2003 | Moffa | 297/253 |
| 6,586,071 | B1 * | 7/2003 | Hanes | 428/99 |
| 7,201,443 | B2 | 4/2007 | Cilluffo et al. | |
| 7,364,230 | B2 | 4/2008 | Zheng | |
| 7,510,241 | B2 | 3/2009 | Nathan et al. | |
| 2002/0063423 | A1 * | 5/2002 | Sessoms | B60R 22/19 280/801.1 |
| 2002/0175254 | A1 * | 11/2002 | Lee | B60N 2/48 248/289.11 |
| 2003/0057749 | A1 | 3/2003 | Buono | |
| 2004/0032541 | A1 * | 2/2004 | Rochel | 348/825 |
| 2004/0160096 | A1 | 8/2004 | Boudinot | |
| 2005/0098593 | A1 | 5/2005 | Schedivy | |
| 2006/0032996 | A1 * | 2/2006 | Wu | A47C 7/72 248/218.4 |
| 2006/0087163 | A1 * | 4/2006 | Cilluffo | B60N 2/4876 297/188.04 |
| 2006/0226322 | A1 * | 10/2006 | Spellman | B60N 2/4876 248/306 |

FOREIGN PATENT DOCUMENTS

| | | | | |
|---|---|---|---|---|
| FR | 2639198 | * | 5/1990 | 108/44 |
| FR | 19950002330 | | 8/1996 | |
| FR | 199816134 | | 6/2000 | |
| JP | 6-197245 | | 12/1992 | |
| JP | 2004-42689 | * | 7/2002 | |
| JP | 20020017861 | | 8/2003 | |

* cited by examiner

MOUNTING ARM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application claims priority from co-pending provisional application No. 60/503,912 filed Sep. 17, 2003, the full disclosure of which is hereby incorporated by reference herein.]

The present invention pertains to a mounting arm and in particular an arm to support an electronic component thereon and to provide for mounting of the arm securely to a surface.

BACKGROUND

Many portable components are useful when they can be carried with a person, used in their home or used in an automobile. However, such components can be easily tampered with by strangers or children and also when not secured, can provide a risk of damage to the component itself by falling or when used in an automobile may become a projectile if not properly secured. For example, electronic components such as DVD (Digital Video Disc) players are easily obtained today in small portable sizes. Such players are useful because they can be used in any situation, including in the home, while traveling on an airplane or in an automobile. However, such electronic components are usually fairly expensive and need to be cared for so that they do not fall and get damaged, cannot be touched by children and do not become a projectile in a moving vehicle. Therefore, there is desired a securement means for securing components such as electronic components in a quick and easy manner to a base support that is securely mounted to a surface so that the electronic component cannot be tampered with, dropped or become a projectile in a moving vehicle.

SUMMARY

In an embodiment the invention provides for an arm for mounting electronic components comprising an arm including a mounting aperture, a support area for receiving the electronic component thereon, a attachment member for fastening at least a portion of the electronic component to the support area in a generally horizontal orientation and an upright member having a rod that mounts to a support surface, and a rod of the upright member is inserted through the mounting aperture in order to mount the base to the support surface. In an embodiment the mounting arm may comprise a rim formed around the support area in order to retain the electronic component in a horizontal plane. In an embodiment the upright member may comprise a headrest mounted to the support surface, including a seat back. In an embodiment the headrest may include a pair of rods protruding there from and the base may have a pair of mounting apertures for receiving the pair of rods. In an embodiment the attachment member may include a hook and loop type strap attached to the base. In an embodiment the base may include a telescoping arm extension. In an embodiment, the support area may include an void for receiving an electrical cord therethrough. In an embodiment, the void is formed in a rim protruding from the support area. In an embodiment, the attachment member may include a offset member. In an embodiment, the offset member may include a resilient band attached to the attachment member in order to form a gap between the attachment member and the upper surface of the electronic component. In an embodiment, the base may include an adjustable arm for adjusting the angle of the arm. In an embodiment, the adjustable arm may include a swivel joint.

In an embodiment, the support area may be hingedly attached to the arm. In an embodiment, the mounting aperture may be open on a side and allows for a rod to be slid therein. In an embodiment, a latch finger may be located at the opening of the aperture in order to retain the rod within the aperture. In an embodiment, a latch finger latches to a latch member disposed on the arm in order to retain the arm to the rod. In an embodiment, the support area may be oriented horizontally with respect to the support surface. In an embodiment, sizing members may be disposed on the rod for mounting the arm to the rod. In an embodiment, a tether member having a proximal end may be attached to the arm and have a biasing tube for attaching a terminal end of the tether member to the arm in order to lock the rod within the aperture of the arm. In an embodiment, a second arm may be mounted directly to the support surface. In an embodiment, a third arm may be protruding from the support surface and connected to the platform.

In a further embodiment a mounting apparatus is provided comprising a support area, an arm attached to the support area, the arm having a mounting aperture having an opening on a side and a support surface having a rod protruding therefrom and the arm supported by the support surface and the mounting aperture for receiving the rod through the open side and received within the aperture. In an embodiment, the mounting aperture may include a latch finger located at the opening of the mounting aperture in order to retain the rod within the mounting aperture. In an embodiment, the support surface may have a clamping member mounted thereto and the arm is secured to the support surface by the clamping member. In an embodiment, the clamping member may comprise a headrest of a vehicle mounted to the support surface via the rod and by sliding of the rod into the support surface the headrest is positioned in order to clap down onto the arm.

In another embodiment a mounting apparatus is provided that includes an arm supported on a support surface, a platform attached to the arm for receiving an electronic component thereon and a slidable clamping member for clamping the arm onto the support surface. In an embodiment, the arm may have a planar upper surface and the clamping member includes a flat clamping surface and the clamping member is adjustable in a direction transverse to the planar upper surface of the arm, so that upon sliding the clamping surface against the planar upper surface, the arm will be trapped between the clamping surface and the support surface. In an embodiment, the clamping member may be a headrest of a vehicle having a pair of rods protruding from its clamping surface and slidingly received in the support surface. In an embodiment, the support surface may be a seat back having a pair of receptacles therein for receiving the rods. In an embodiment, the arm may include a pair of holes correspondingly shaped and oriented to the placement of the rods of the headrest and receptacles so that the rods may be inserted through the holes and received in the receptacles of the seat back. In an embodiment, the platform may be hingedly attached to the arm.

BRIEF DESCRIPTION OF THE FIGURES

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
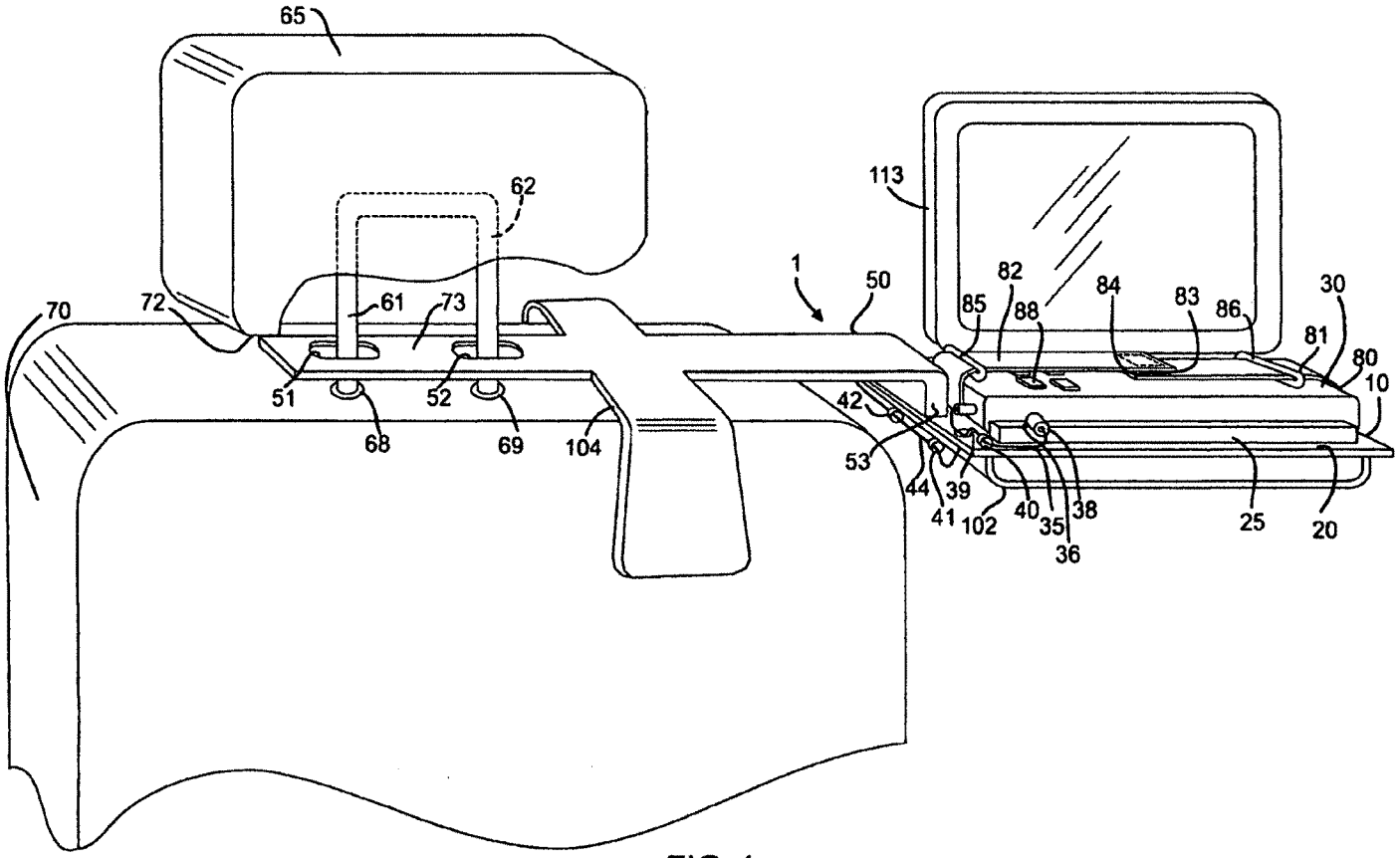
FIG. 1 is a perspective view of a mounting arm of the present invention mounted within a vehicle having an electronic component attached thereon.

Embodiments of a mounting arm 1 of the present invention are depicted with respect to FIGS. 1-5. Although each FIG. depicts various embodiments of the invention, like numerals identify like elements of all of the FIGs. A base or platform 10 is provided having a mounting or support area 20 for receiving an electronic component 30 thereon. FIG. 1 depicts a DVD (Digital Video Disc) player 30. However, the present invention can be used to secure all types of components such as navigation systems, portable radios, lap-top computers, personal digital assistants, or other portable devices. The mounting area 20 includes a ridge 25 surrounding the mounting surface. In an embodiment, the base 10 and ridge 25 are integrally molded of a polymer material such as polypropylene or other hard plastics. In another embodiment, the ridge 25 may be formed of a softer polymer material such as santoprene so that electrical cords 35 exiting from the electronic component may be engaged in the soft material of the ridge 25 so that a depression 36 is formed in order to cradle the plug 38 and act as a strain relief for the cord 35 and plug 38. In an embodiment, the ridge 25 may surround the mounting area 20 on all four sides. In an alternate embodiment, the mounting arm 1 may be formed of wood or other composite.

In an embodiment, the platform 10 also includes holes 39 formed therein in to receive electrical cords or cables 35 therethrough. The cords 35 may be routed through the holes 39 to the underside of the platform 10 so that they do not clutter-up the working area on the top side of the platform 10. Also provided on the top side and underside of the platform 10, in an embodiment, are loops 40, 41, 42 that clamp onto and route the cables or wires 35, 44 along the platform 10. In an embodiment, cable 35 may provide power and connect to a power outlet or cigarette lighter of a vehicle. In an embodiment, wire 44 may provide audio output and connect to an earbud or headset for a passenger of a vehicle to listen to the electronic component 30. The loops 40, 41, 42 and holes 39 combine to provide a cable management system that maintains the electronic component in a safe and easy to use environment.

The base or platform 10 has an arm 50 attached thereto. In an embodiment, the arm 50 may be integrally molded to the platform 10 via bend 53. In other embodiments, the arm 50 may be attached with fasteners including screws, brackets, adhesives or hinges. The arm 50 includes mounting apertures 51, 52 formed at its terminal end. In an embodiment, the mounting apertures 51, 52 receive a rod or rods 61, 62 of the clamping member, upright member or head rest 65 of the vehicle there through. The rods 61, 62 extend through the mounting apertures 51, 52 into receptacles 68, 69 of the top of the support surface or seat back 70. For example, FIG. 1 illustrates the top of the seat back 70 (e.g. a driver's seat) of a vehicle such as an automobile, viewed from the rear, facing toward the front of the car. In an embodiment, the rods 61, 62 have serrations formed thereon so that the clamping member 65 is adjustable and may lock in place so that its lower clamping surface 72 abuts against the top planar surface 73 of the arm 50 so that it captures the arm 50 and clamps it between the bottom clamping surface 72 and the top of the support surface 70. In an alternate embodiment, the rods 61, 62 may be a single flat bar or other vertical structure. The mounting arm 1 may be used in environments other than a vehicle, for example in a home, business or outdoors. The arm 1 can be mounted to any support surface having a vertical member protruding from an upright member.

The base or platform 10 further includes an attachment member 80 which is secured to the platform 10 and helps to securely attach the electronic component to the base 10. In an embodiment, the attachment member 80 may include elastic straps having hook and loop fasteners, such as a pair of Velcro® straps 81, 82 that are attached at both sides of the mounting surface 20. The straps 81, 82 may be secured to the mounting area, for example by fasteners, adhesive or insert molding. The straps 81, 82 may be placed over the electronic component 30 by stretching the resilient, elastic straps 81, 82 to an extended position. In an embodiment, the straps 81, 82 may be stretched tightly so that the ends having Velcro® strips 83, 84 are fastened to each other in order to securely hold the electronic component 30 thereto. However, other types of attachment members may provided, such as clips, clamps or fingers in order to clamp the edges of the electronic component 30 to the mounting area 20 or ropes, strings or bungee cords may be attached to the platform 10 and resiliently placed around the electronic component 30.

In an embodiment, the straps 81, 82 may include compression or offset members 85, 86 such as rubber sleeves that are slid onto the straps 81, 82 (FIG. 1). The offset members 85, 86 provide an offset between the strap 81, 82 and the top surface of the electronic component 30. The electronic component includes buttons 88 that control the operation of the electronic component 30. For example, the button 88 may be the play, rewind, fast-forward or stop button to control the operation of a DVD. In order to prevent the straps 81, 82 from pushing down and activating the buttons 88 when the straps 81, 82 are pulled taught over the top of the electronic component 30, offset members 85, 86 are adjusted by sliding along the straps 81, 82 so that the offset members 85, 86 are adjacent the buttons 88 and the strap 81, 82 is elevated slightly above the surface of the electronic component at the area near the buttons 88. Although the straps 81, 82 are elevated above the top surface of the electronic component, the offset members 85, 86 still transfer the compression or gripping force of the straps 81, 82 to the electronic component 30 in order to securely hold the electronic component 30 to the platform 10.

Figure 2:
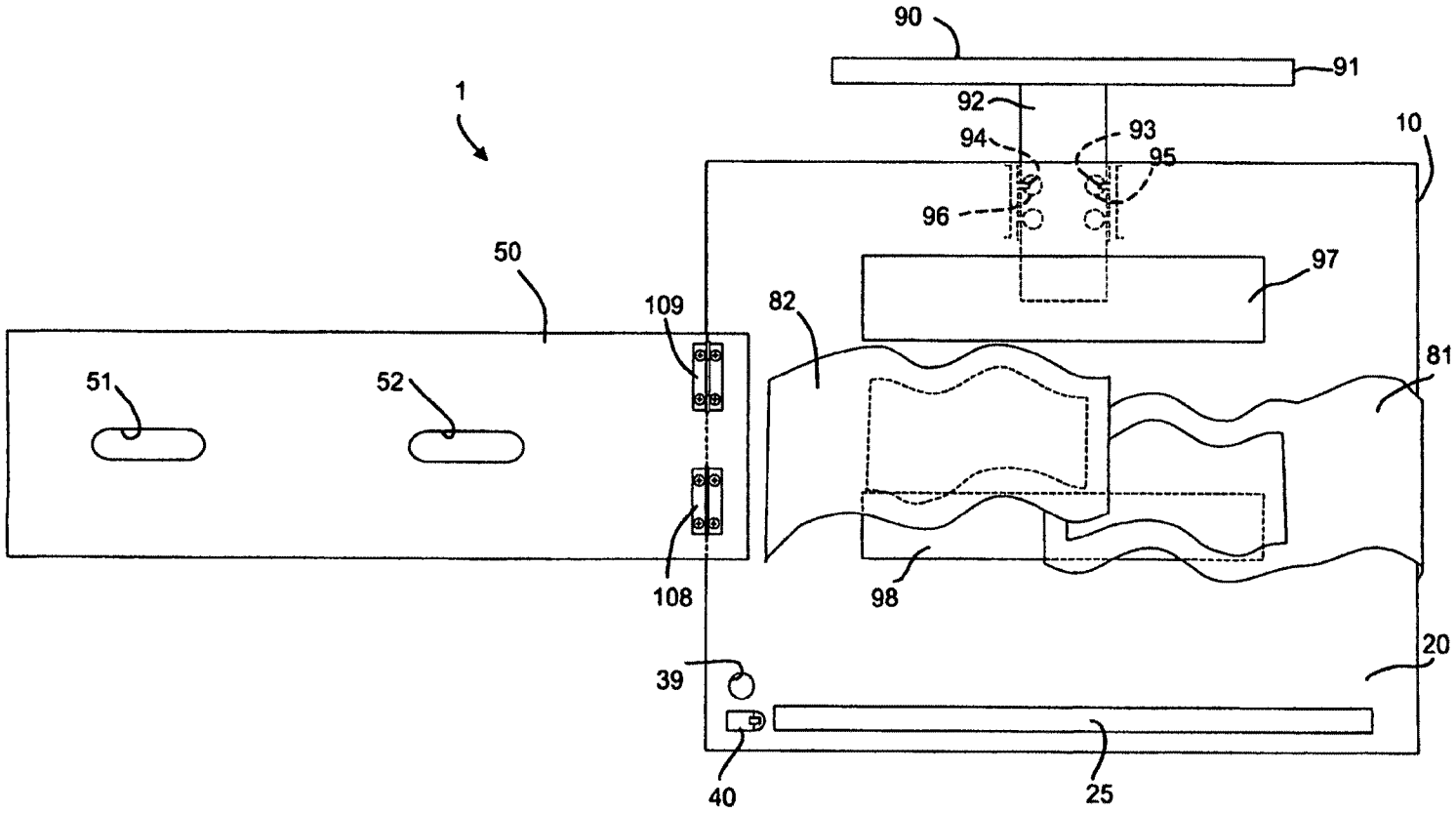
FIG. 2 is a plan view of an alternate embodiment of the mounting arm of FIG. 1.

In an embodiment, an adjustable rim member 90 is provided that extends from the platform 10 (FIG. 2). A rim 91 is attached to a neck 92 that slidably extends from a cavity formed in a side of the platform 10. The rim 91 extends above the plane formed by the mounting area 20 so that it may abut against a side of an electronic component placed on the mounting area 20. The neck 92 may be locked in position, in an embodiment, via fingers 93, 94 that engage notches 95, 96 formed on the sides of the neck 92. The fingers 93, 94 are mounted on a resilient bellows so that upon sliding of the neck in or out of the cavity, the fingers 93, 94 may resile and be pushed out of the notch 95 and engage the adjacent notch so that the neck may be locked in multiple positions. Although only two notches are depicted in FIG. 2 on each side of the neck 92, it is to be understood that multiple notches 95, 96 may be provided and multiple corresponding fingers 93, 94 provided to allow fine adjustment of the rim 91. Other known means of retaining the adjustable rim 90 and allowing for locking and adjustability may be provided.

The rim 91 may be positioned to abut against the edge of the electronic component 30 mounted on the platform 10. Thus, the electronic component 30 is captured between the ridge 25 on one side and the adjustable rim 91 on the other side so that the X-Y or lateral movement of the electronic component 30 is restricted by the rim 91 and ridge 25. In an embodiment, the ridge 25 may surround the mounting area 20 on at least three sides so that lateral movement is restricted in all directions. Vertical movement or movement in the Z axis is restricted by the attachment members 81, 82 placed around the electronic component 30. As additional means of restricting movement of the electronic component 30, to insure that it cannot come loose during high speed deceleration, attachment members 97, 98 such as Velcro® strips may be mounted on the mounting area 20 with adhesive. Corresponding strips can be secured to the bottom of the electronic component 30 in order so that the attachment members' 97, 98 hooks or loops can engage one another on each side of the Velcro® strips in order to provide additional retention means.

In an embodiment, the platform 10 may have a tray 102 formed underneath for storage of articles such as DVD storage jewel boxes or a remote control device for a DVD player. The arm 50 also may include a stabilizing member 104. In an embodiment, the stabilizing member 104 is a U-shaped clip that is attached to the arm 50 generally at a midpoint and each of the arms clamp onto the sides of the support surface or seat back 70. In an embodiment, the stabilizer may be integrally molded with the arm 50 (FIG. 1) or attached to the arm 50 with fasteners such as screws 105 (FIG. 3).

The mounting arm 1 may be rotated so that the arm 50 is located on the other side of a vehicle and mounted to the headrest of the other (passenger) seat. It is also understood that in a vehicle with multiple rows of seats, that the mounting arm may be attached to any seat, in any of the rows. As well, the mounting arm may be used in other vehicles such as boats or airplanes, etc. In an alternate embodiment, the base 10 may include a telescoping arm that may slide out from the interior of the base. The telescoping arm may allow for the base 10 to be extended so that larger components may be mounted thereto or the component mounted to the mounting surface may be moved in its orientation between the seats of a vehicle so that it may be more easily viewed by passengers in the automobile. In a further alternate embodiment the platform may include an arm extending from each side so that the platform may be supported on both sides and each arm is attached to both seats adjacent the platform.

As shown in FIG. 2, the mounting arm 1 may have no stabilizer and also may have a flat profile. In other words, the bend 53 formed in the arm, depicted in FIG. 1, may be removed so that the platform 10 is collinear with the arm 50. The benefit of such a uniformly linear construction is that the arm 50 may be packaged in a flat box to save shipping costs. As well, hinges 108, 109 may be provided on the arm 50 to allow for the platform 10 to pivot 180 degrees and fold onto the arm 50 in order to further reduce the length of the mounting arm 1 for shipment. Once installed the hinges 108, 109 may allow for movement of the platform for access through the center of a vehicle, in certain embodiments.

Figure 3:
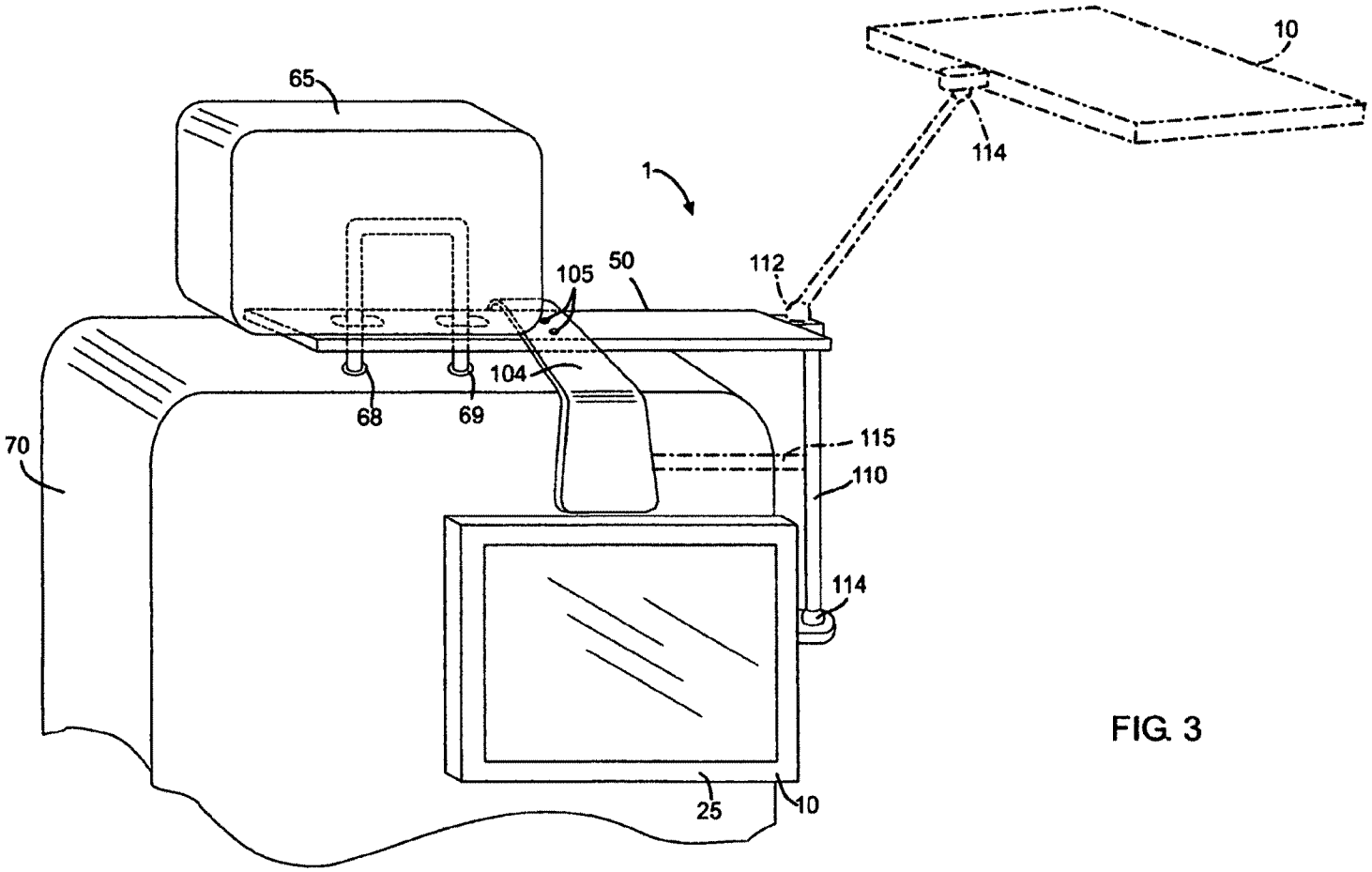
FIG. 3 is a perspective view of an alternate embodiment of the mounting arm of FIG. 1.

In an alternate embodiment, shown in FIG. 3, a swivel-type or a pivoted arm will also allow for folding of the mounting arm to reduce its length during shipment and storage. A secondary arm 110 having swivel joints 112, 114 at each end is mounted between arm 50 and platform 10. It is understood that the mounting arm 110 allows for the platform 10 to be rotated into a storage position against the back of the seat 70, or (as shown in phantom) in an erect position to allow for viewing of the electronic device (not shown) in many positions. The pivot connection means 112, 114 allows for adjustment of the platform both vertically and horizontally so that line of sight viewing is maximized for all passengers while providing limited obstruction of sight for the driver, such as through the rear view mirror of a vehicle. It is to be understood that the screen or monitor 113 (FIG. 1) of the electronic component 30 may be easily moved to further increase line of sight viewing due to the construction of the attachment members 80 in an embodiment of the invention that are oriented in order not to obstruct the rotation or movement of the monitor 113.

In an alternate embodiment, the second arm 110 may be mounted directly to the seat 70 via a third arm 115. In an embodiment, the third arm 115 may be a metallic rod that is welded to the interior frame of the seat 70, in place of arm 50. A swivel joint may be provided to connect the third arm 115 to the second arm 110 so that the arm 110 may be adjustable. The third arm 115 may be slidably mounted within the seat 70 to provide for additional adjustability of the arms 110, 115.

Figure 4:
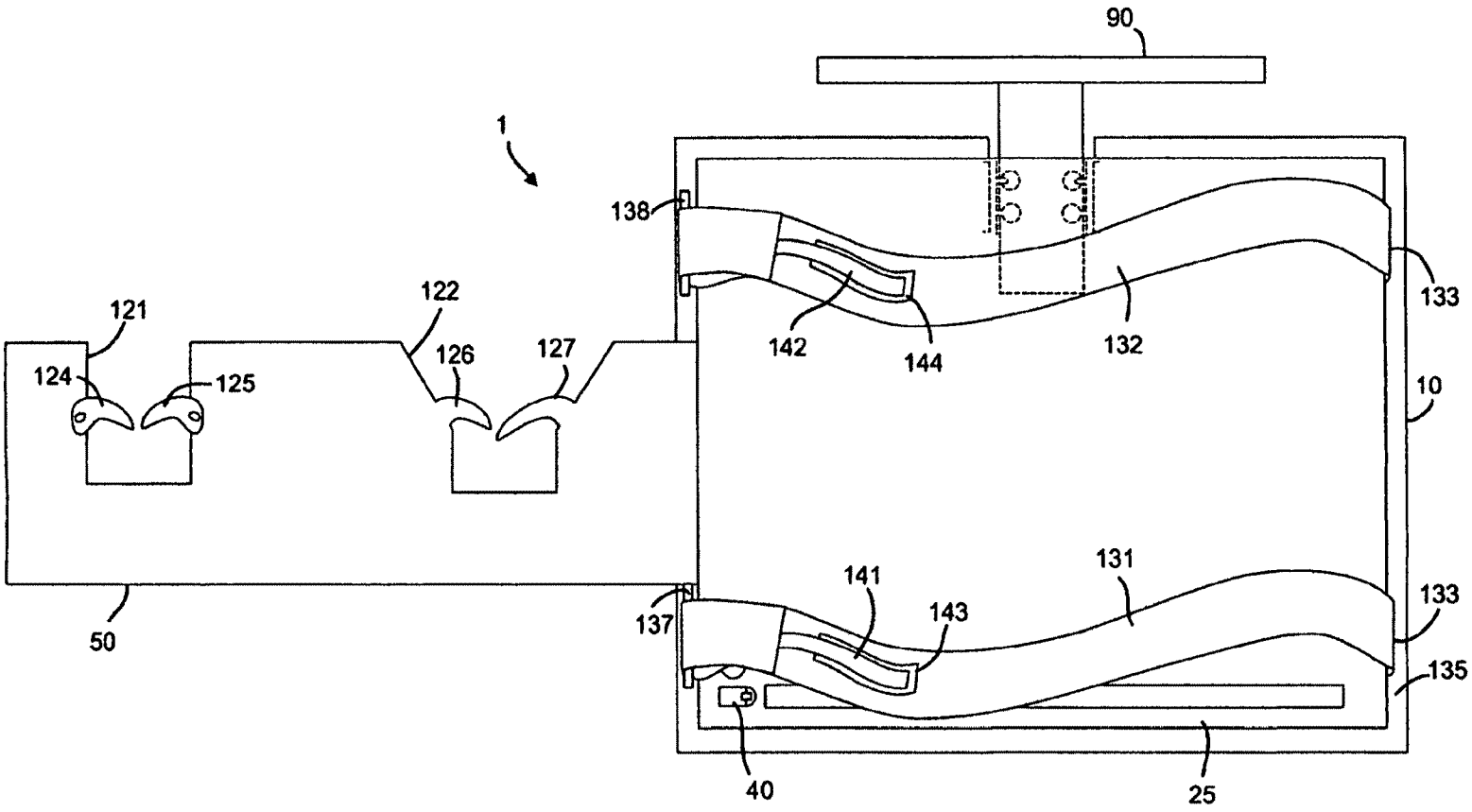
FIG. 4 is a plan view of an alternate embodiment of the mounting arm of FIG. 1.

Turning to FIG. 4, a further alternate embodiment of the mounting arm of the present invention is depicted. Attached to the platform 10 is arm 50 that includes mounting apertures 121, 122. For expediency FIG. 4 depicts non-uniform mounting apertures 121, 122; however, in an embodiment each mounting aperture 121, 122 may be uniform and have similar mounting mechanisms. In the embodiment depicted, mounting aperture 121 includes a pair of metallic latch fingers 124, 125 that are pivotally mounted on the arm 50 at the closed end of the aperture 121. Each finger 124, 125 is tapered so that its terminal end is pointed in order to allow the rods (not shown) of a clamping member to slide easily therepast. A biasing member such as a spring may be attached at the pivot point in order to return the latch fingers 124, 125 to its closed position (as shown in FIG. 4).

The mounting mechanism of mounting aperture 122 is similar to that of mounting aperture 121, except that it includes a pair of plastic latch fingers 126, 127 that are attached to the arm 50. The plastic latch fingers 126, 127 are formed of a resilient polymer material that allow for the latch fingers 126, 127 to spring back to the closed position (as shown in FIG. 4) after a rod has been slid between the latch fingers 126, 127. In an embodiment, the entire arm 50 may be molded of a polymer material and the latch fingers 126, 127 integrally molded therewith. In an alternate embodiment, the arm 50 may be metallic or wood and the latch fingers 126, 127 may be attached thereto with adhesives or fasteners. Another alternate embodiment is to have spring biased latch fingers such a provided by a carabiner. The opening to the mounting aperture 122 has tapered walls so that it may be easier to locate a rod of a clamping member therein. However, straight walls such as shown for mounting aperture 121, may provide sufficient area to receive a rod therein. In an embodiment, both of the mounting apertures 121, 122 may have tapered walls, or both mounting apertures 121, 122 may have straight or any other shaped walls.

The installation steps for the embodiment depicted in FIG. 4 will be described for both the mounting aperture 121 and mounting aperture 122 (even though the latch fingers 124, 125 will operate differently than latch fingers 126, 127) with regard to an application where the mounting arm 1 is mounted to the seatback of an automobile, van, truck or SUV. The embodiment of FIG. 4 does not require the removal of the clamping member or headrest from the seatback. (The embodiments of FIGS. 1-3 may require removal of the headrest in order to mount the mounting arm thereto). The headrest is slid to its upper-most position so that the rods protruding from the headrest are exposed. The arm 50 is aligned so that the mounting apertures 121, 122 are adjacent the pair of rods of the headrest. The arm 50 is then pushed toward the rods so that the rods engage the latch fingers 124, 125, 126, 127 and cause the latch fingers 124, 125, 126, 127 to bend or rotate inward, so that the gap between the latch fingers 124, 125 and 126, 126 expands so that the rods may be received within the mounting apertures 121, 122. The latch fingers 124, 125, 126, 127 spring or rotate back to their closed position in order to lock the rods within the mounting apertures 121, 122. The clamping member or headrest is then slid downward to clamp down onto the arm 50, in order to hold the mounting arm in a secure position on the seat back. To release the arm 50, the headrest is slid upward and the latch fingers 124, 125, 126, 127 are compressed by a person's fingers or by a tool in order to provide a gap between each pair of latch fingers 124, 125 and 126, 127 so that the rods may be slid out of the mounting apertures 1221, 122 and the arm 50 removed.

An electronic component may then be mounted to the platform 10. In the alternate embodiment depicted in FIG. 4 a pair of attachment straps 131, 132 retain the electronic component (not shown). In an embodiment, the straps 131, 132 are mounted at edge 133 and are sandwiched by strip 135 against the edge 133. In an embodiment, the straps 131, 132 may also be secured by adhesive or fasteners, such as staples. Each strap 131, 132 may extend across the length of the platform 10 and be received under a bracket 137, 138 and looped back on itself so that its terminal end 141, 142 having a hook type strip, may be secured to a loop type Velcro® strip 143, 144 attached on the straps 131, 132. It may be understood that by pulling the terminal ends 141, 142 toward the edge 133, the elastic straps 131, 132 become more taught and tighten over an electronic component (not shown) that is placed under the straps 131, 132.

Figure 5:
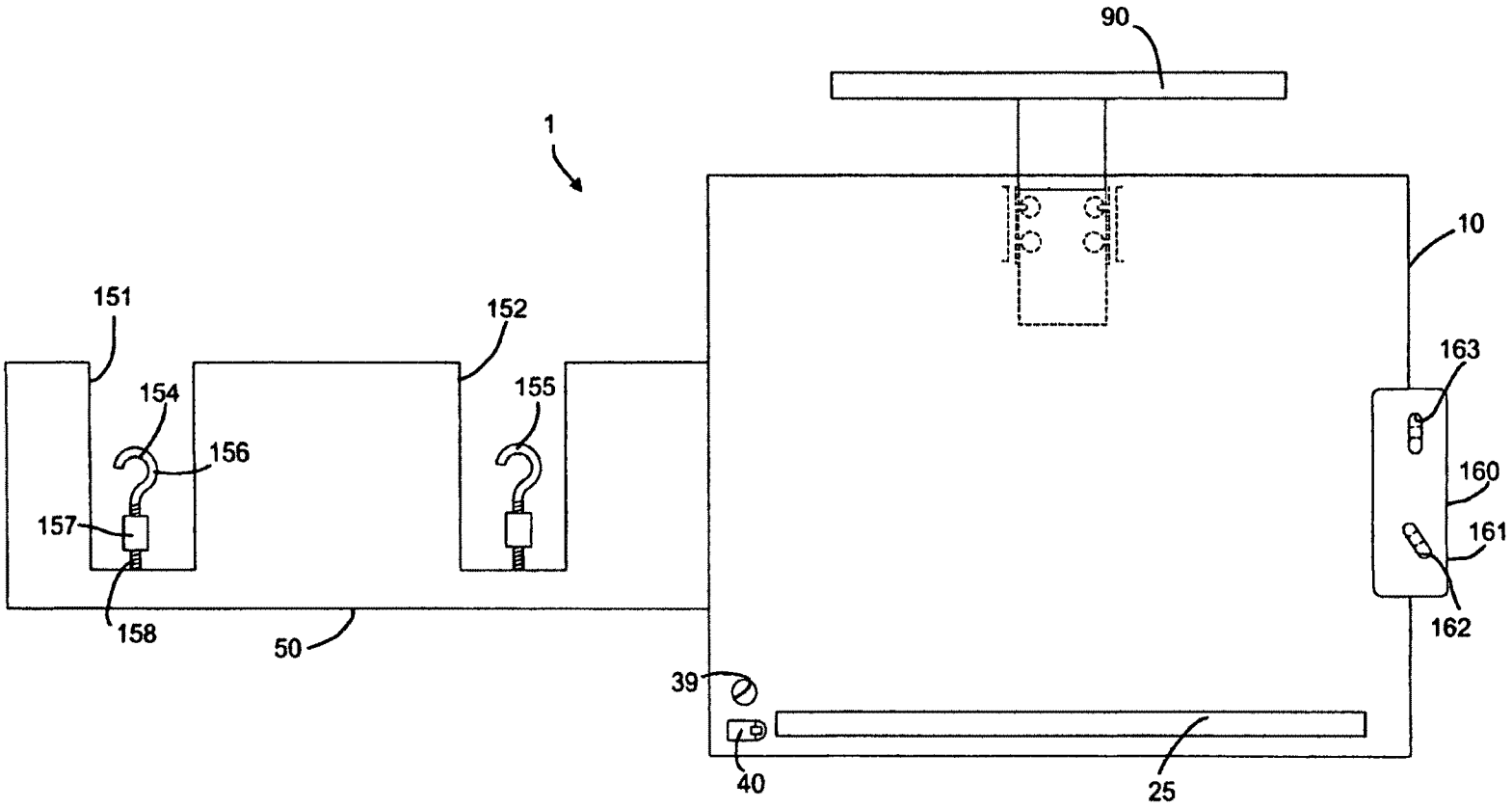
FIG. 5 is a plan view of an alternate embodiment of the mounting arm of FIG. 1.

Turning to FIG. 5, a further alternate embodiment is depicted. A platform 10 has arm 50 attached. The arm 50 includes mounting apertures 151, 152 formed therein. Each mounting aperture includes a mounting member 154, 155 attached therein for mounting the arm 50 to a clamping member, such as a headrest. In an embodiment, the mounting members 154, 155 includes a hook shaped threaded member 156 attached to a rotating adjustment member 157 that is mounted to a threaded base member 158. A rod from a clamping member or headrest is received within the mounting aperture 151, 152 and slid past and into the hook shaped member 156. The rotating adjustment member 157 may then be rotated so that it simultaneously threads on the threaded portions of the hook member 156 and the base member 158 so that the distance between the hook member 156 and the base member 158 is decreased and the hook 156 pulls the rod of the headrest further into the mounting aperture 151, 152 so that the arm 50 is secured to the headrest. After complete rotation of the adjustment member 157 to its most restricted position, the clamping member or headrest may be lowered down and clamped down onto the arm 50. Removal of the arm 50 is accomplished by reversing the above steps.

In an alternate embodiment, alternate mounting members may be provided for installing the mounting arm 1 to a clamping member or headrest. The mounting members may be attached within a mounting aperture or the arm 50 may have no mounting aperture and the mounting members may be attached to the arm 50 and protrude from a side of the arm 50. In an embodiment, the mounting member may be a clamp, a threaded cross bar, a lock knob, a shackle, a radial flange, a latch or other known fasteners.

Also depicted in FIG. 5 is an alternate embodiment of an attachment member 160 that includes a clamping board 161 having a pair of fasteners, for example, wing-nut screws 162, 163 attached thereto for tightening the clamping board 161 down onto an electronic component (not shown) placed on the platform 10. The clamping board 161 may be formed of a polymer material, wood, composite or metal. It may include a resilient pad on its lower surface for abutting against the upper surface of the electronic component.

Figure 6:
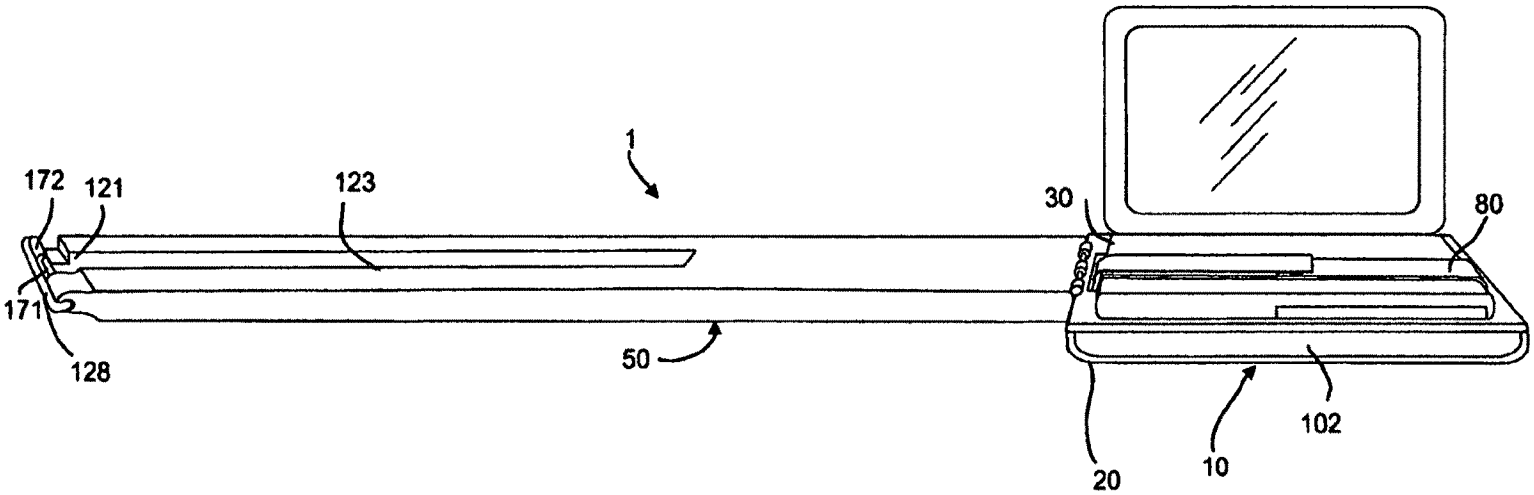
FIG. 6 is a perspective view of an alternate embodiment of a mounting arm having an electronic component mounted thereto.

FIG. 6 depicts a mounting arm 1 that is similar to the previous embodiments and includes a platform 10 having an arm 50. The platform 10 includes an attachment member 80 as discussed above for holding an electronic component 30 to the support area 20 and a pocket or shelf 102 for receiving and storing accessories therein. The arm 50 includes a mounting aperture 123. In the embodiment depicted, the mounting aperture 123 includes a resilient latch finger 128 that is pivotally mounted on the arm 50 at the open end 121 of the aperture 123 (see FIGS. 6 and 7). The proximal end of the finger 128 is secured to the end of first side 181 of the arm 50 at a loop 169. In an embodiment, the loop 169 may be integrally formed with the arm 50. For example, the finger 128 may be a resilient cord that is insert molded with loop 169. In other embodiments the finger 128 may be attached to the loop 169 by other means such as fasteners, snap-fit or adhesives.

The finger 128 is detachable from one of a plurality of latch members 171, 172, so that its terminal end 174 may be moved away from the aperture opening 121 in order to allow the rods (not shown) of an upright member to slide easily therepast and into the aperture 123. In an embodiment, the latch finger 128 may be a resilient band such as a rubber band, polymer cable, synthetic band or other elastic member. In an embodiment, each latch member 171, 172 is spaced a predetermined distance from each other and the latch finger 128 has a predetermined length, so that upon latching the latch finger 128 within the first latch member 171 a first latch position of the arm 50 is provided. Upon latching the latch finger 128 with the second latch member 172 a second latch position of the arm 50 is provided. It is to be understood that additional latch members may be attached to the arm 50 in order to provide additional latch positions.

In an embodiment, the aperture 123 includes a gripping liner 175. In an embodiment, the liner 175 extends around the entire inner surface of the aperture 123. In an alternate embodiment, the liner 175 may be located at predetermined positions in order to correspond with the location of the rods (not shown) located within the aperture 123. Thus, for example, operation of the arm 50 may occur in the following steps. The latch finger 128 is removed from the latch member 171 or 172. The headrest of a vehicle is raised to expose the rods protruding from the bottom of the headrest or upright member. It is not necessary to remove the headrest from the seat-back or upright member. The arm 50 is positioned so that the open end 121 of the aperture 123 is adjacent the inner most rod (closest to the center of the vehicle). The arm 50 is then moved under the headrest so the rods slide into the aperture 123. The width of the aperture 123 is predetermined to be slightly larger than the diameter of the rods. After the rods are completely received within the aperture, so that the inner most rod is adjacent the closed end of the aperture 123, the latch finger 128 is secured. By securing the latch finger 128 to the latch member 171, 172 the first side 181 of the arm 50 is pulled toward the second side 182 so that the gripping liner 175 abuts and presses against the rods. In an embodiment, the gripping liner 182 is formed of a resilient rubber, polymer or synthetic that both compresses upon abutment, but also provides friction against the rod. In an embodiment, a santoprene liner may be insert molded within the aperture 123 to form the liner 175. The liner 175 may also have other configurations, such as being formed as a cap or buttons attached to the inner wall of the aperture 123. After securing the arm 50 to the upright member or seatback, an electronic component is mounted to the platform 10 via the attachment member 80 as discussed above. Thus, it may be understood that the securement of the latch finger 128 allows for the arm 50 to clamp onto the rods and to provide sufficient gripping of the rods so that the arm 50 can support the weight of an electronic component mounted on the platform 10 (as shown in FIG. 6). Therefore, it is not necessary to lower the headrest or use a clamping member to hold the arm in a position to offset the weight of an electronic component mounted on the platform 10.

Figure 7:
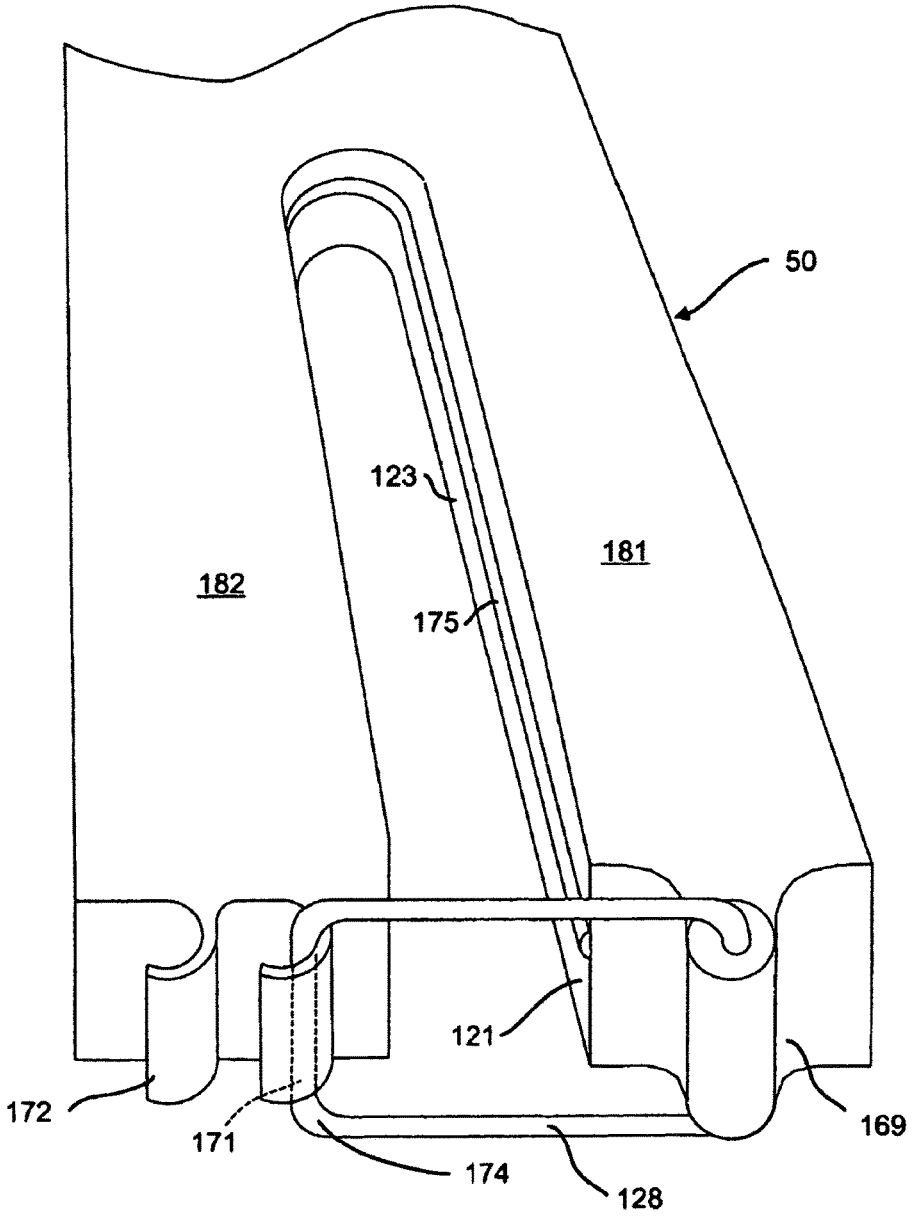
FIG. 7 is an enlarged perspective view of the end of the arm of the mounting arm of FIG. 6.

In a further embodiment, the arm 50 may provide for clamping to rods having varying diameters. For example, a first position provided by latch member 171 (as shown in FIG. 7) provides for clamping of a rod having a first diameter and a second position provided by latch member 172 (as shown in FIG. 6) provides for clamping of a rod having a second diameter (greater than the first diameter). Additional clamping members may be provided by the clamping arm 50 in order to provide additional clamping positions for additional sized rods.

Figure 8:
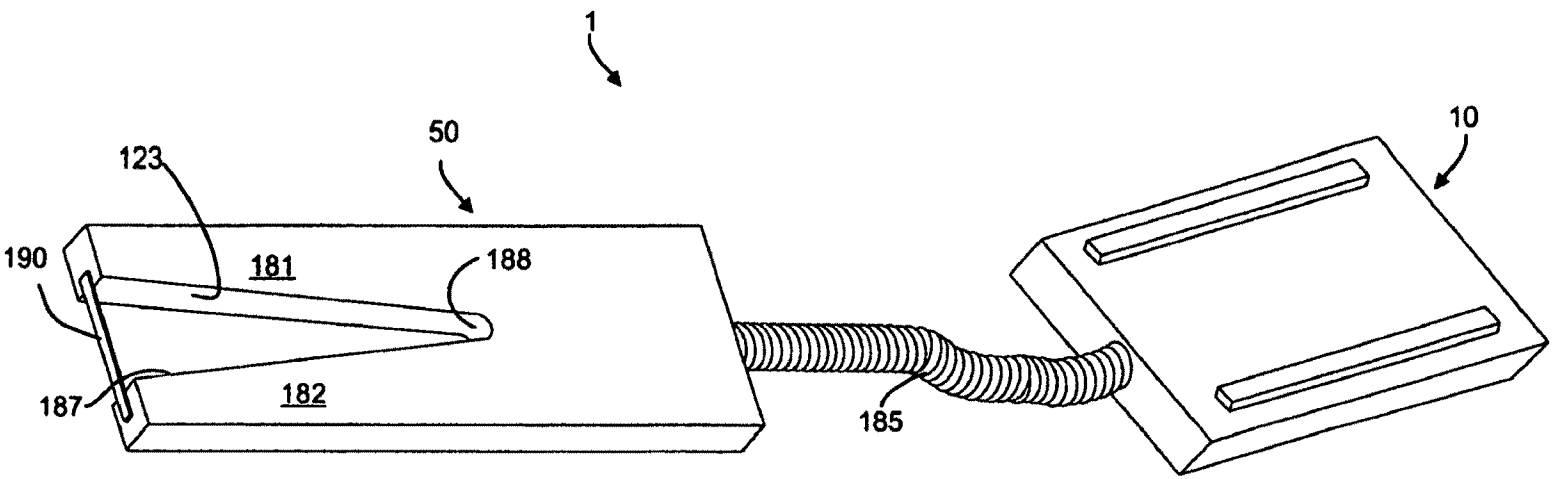
FIG. 8 is a perspective view of an alternate embodiment of a mounting arm.

FIG. 8 provides for another alternate embodiment of the mounting arm assembly 1 of the present invention. As discussed above, the mounting arm 1 includes a platform 10 and an arm 50. Disposed between the arm 50 and the platform 10 is a snake arm or flexible coil 185. The arm 50 includes an aperture or slot 123 for receiving the rods (not shown in FIG. 8) of a headrest therein. The slot 123 is tapered so that the slot at the terminal end 187 is wider than the slot adjacent the proximal end 188 of the arm. The tapered slot 123 allows for the rod of a headrest located toward the inner part of the vehicle to be received in the slot 123 first, very easily due to the wide opening 187 of the slot 123. As the arm 50 is slid further along the seat-back or upright member the first rod is received at the narrow end 188 of the slot which has a width slightly larger than the diameter of the rod. The second rod of the headrest will then be received at the wide end 187 of the slot 123 and the arm 50 can be secured to the seat-back or upright member by latching of a fastening member 190. For example, is depicted in FIG. 8, a Velcro strap 190 may be placed across the terminal end 187 of the arm enclosing the wide opening of the slot 123. In an alternate embodiment, a latch buckle 190 may be mounted onto an arm 50 that grabs the first side 181 of the arm 50 and pulls it toward the second side 182 of the arm by closing the open end 187 of the slot. Such a clamping motion by the latch buckle 190 will cause the sides 181, 182 of the slot 123 to clamp onto the second rod of the headrest. In an embodiment, the first rod may act as a fulcrum upon which a side of the arm 50 may pivot. In an embodiment, a gripping surface such as a rubber pad or santoprene insert may be provided on the sides 181, 182 of the slot 123 adjacent the resting spot of the rods of the headrest within the slot 123 to provide gripping of the rods as discussed above.

Thus, it may be understood that upon mounting of the arm 1 to a headrest or other mounting device, an electronic device such as a DVD player may be mounted to the platform 10 using straps, clamps, fasteners as discussed above. After the electronic device is mounted to the platform 10, the snake arm 185 may be manipulated and bent so that the platform 10 is located in a desired position. For example, if the mounting arm 1 is used in a large vehicle with a high ceiling and good rear visibility through the rear view mirror, the snake arm 185 may be extended parallel to the arm 50 so that the platform 10 is located between two (front) seats at the same height as the top of the seat-back or upright members for viewing by passengers in the second row of the vehicle. If the arm 1 is mounted in a vehicle that is a bit smaller and has a generally low ceiling with limited visibility through the rear view mirror, the snake arm 185 may be adjusted vertically and pushed downward so that the platform 10 is lowered below the level of the top of the seat-backs and the screen of the electronic component, when extended, will not block the rear view mirror. As well, the snake arm 185 may be adjusted laterally so that the platform 10 is moved closer to the viewers in the middle and back row of the vehicle. For example, if only one passenger is located in the rear seat, the snake arm 185 may be adjusted so that the platform is located behind the seat to which the mounting arm 1 is mounted and directly in front of the sole passenger. It is to be understood that the mounting arm 1 may also be mounted to the seat-backs of the middle row of a vehicle, such as a mini-van or SUV, so that the passengers in the back row may view the electronic device mounted to the platform 10.

Figure 9:
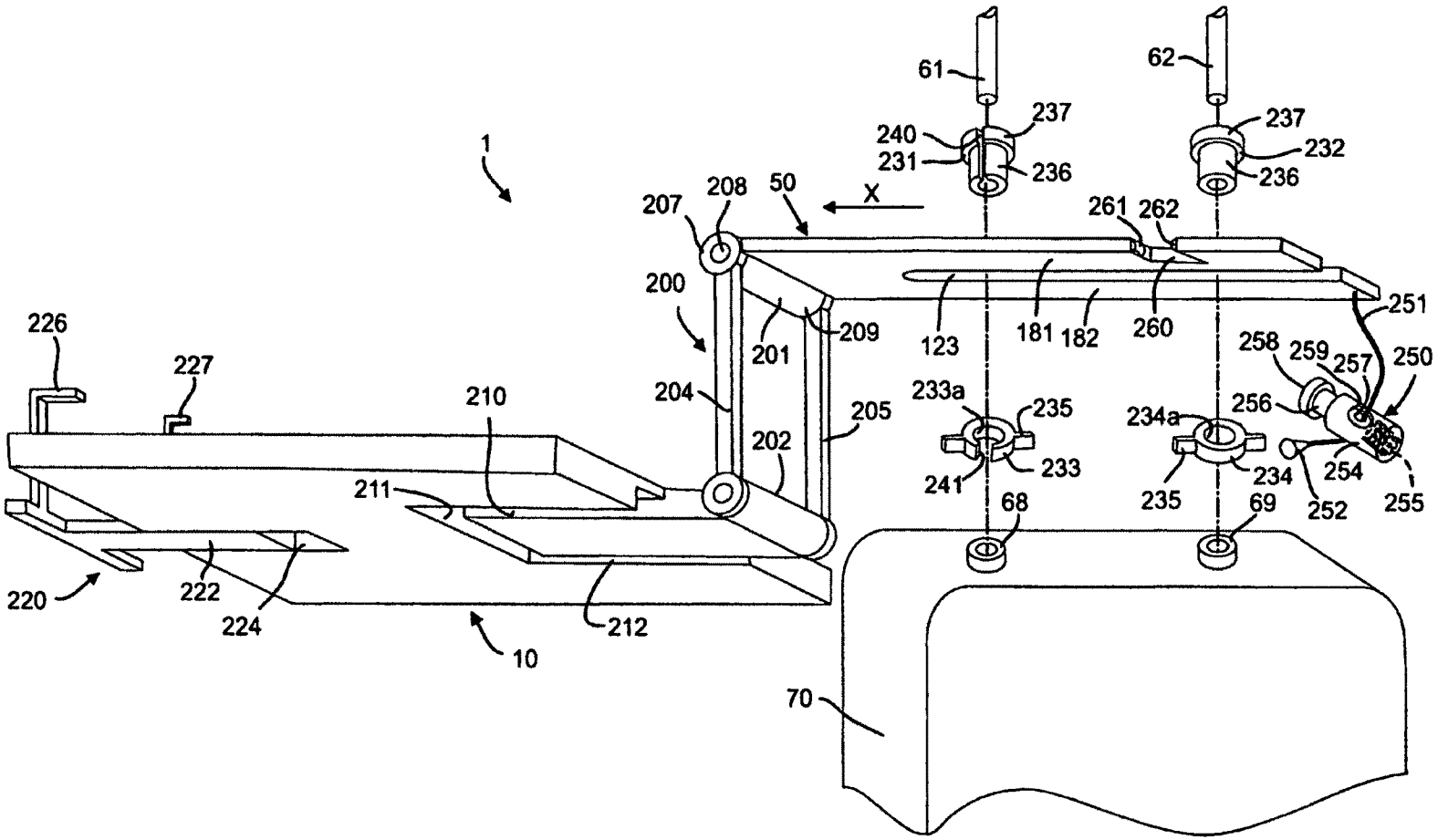
FIG. 9 is a perspective view of another alternate embodiment of a mounting arm and a seat-back of a vehicle to which the mounting arm may be mounted.

FIG. 9 is a further alternate embodiment of the mounting arm assembly 1 of the present invention that includes an arm 50 and a platform 10. The platform 10 is connected to the arm 50 via a swivel member 200. In an embodiment, the swivel member includes a first hinge 201 and a second hinge 202. Disposed between the first and second hinge 201, 202 are supports 204, 205. The supports 204, 205 are connected to the arm 50 via the first hinge 201 and to the platform 10 via the second hinge 202. In an embodiment, each hinge 201, 202 includes positioning means in order to lock each hinge 201, 202 in a predetermined position. For example, as shown in FIG. 9, the arm 50 is positioned at a 90 degree angle to the swivel member 200 and the platform 10 is also positioned at a 90 degree angle from the swivel member 200 and parallel to the arm 50. Such positioning can be used for vehicles that require the electronic component to be lowered in a mounting position in order to provide maximum clearance for viewing through the rear view mirror. Such positioning can be attained by locking members provided within the hinges 201, 202. In an embodiment, ratcheting gears or pins (not shown) are disposed for example in end caps 207. The end caps 207 rotate around an axle 208 that protrudes through a hinge knuckle 209 attached to the arm 50. Ratcheting gears are disposed to engage the hinge knuckle 209 and end cap 207 in order to lock the hinge 201, 202 in the predetermined position.

An alternate position may be provided by the swivel member 200 positioned parallel to the platform 10 and arm 50. Ratcheting gears may lock the end cap 207 so that the supports 204, 205 are parallel to the arm 50. In an embodiment, the platform 10 includes recesses 210, 211, 212 for receiving the swivel member 200 therein when the mounting arm assembly 1 is folded in its storage position. For example, the swivel member 200 may be rotated clockwise, from the position shown in FIG. 9, so that support 204 is received in recess 210, hinge 201 is received in recess 211 and support 205 is received in recess 212. The arm 50 is rotated around hinge 201 so that it is parallel and abutting the bottom of the platform 10. Positioning members or ratcheting gears provided within first and second hinges 201, 202 act to lock the mounting arm assembly 1 in the storage position. Unlocking of the mounting arm assembly may be accomplished by unlocking means, for example, depressing an axle button 208 to release the ratcheting members within the end caps 207. It is to be understood that the swivel member 200 may also be positioned in a multitude of other predetermined positions via the coordination of the first and second hinges 201, 202.

In an embodiment, the platform 10 includes an attachment member 220 that includes a slide neck 222 received in a groove 224 and a pair of securement hooks 226, 227. After placement of an electronic component, such as an MP-3 player (not shown), to the platform 10, the attachment member 220 is moved by sliding the neck 222 into groove 224 so that fingers 226, 227 slide over and grip onto the top edge of the electronic component in order to secure the electronic component to the platform 10. Notches as discussed above may be provided on the neck 222 or groove 224 in order to provide ratcheting of the attachment member. The hooks 226, 227 may be shaped in varying orientations. Depending on the size of the electronic component desired to be mounted to the platform 10, the hooks 226, 227 may have varying predetermined shapes. As well, the hooks 226, 227 may be formed of a variety of materials in order to provide a desired clamping function. For example, the hooks 226, 227 may be formed of an elastic material so that different sized electronic components may be accommodated for securement by a single shaped finger 226, 227. As discussed above, additional attachment members, such as straps or fasteners may be used to attach an electronic component to the platform 10.

The mounting arm assembly 1 of FIG. 9 may be mounted to a seat-back or upright member 70 via attachment of the arm 50 to rods 61, 62 (shown segmented) of a headrest (not shown). In an embodiment, the rods 61, 62 may be received in an aperture 123 as discussed above. However, as depicted in FIG. 9, sizing discs 231-234 may help to attach the arm 50 to the rods 61, 62 as discussed with respect to the following mounting methods. As shown in FIG. 9, the headrest may be removed from the seat-back or upright member 70. Lower sizing discs 233 and 234 are placed over the receptacles 68, 69 provided along the top of the seat-back 70. In an embodiment, the lower sizing discs 233, 234 have predetermined sized apertures 233a, 234a and snap-fit around the outer diameter of the receptacles 68, 69. Other mounting means may also be provided on the lower sizing discs 233, 234 such as détentes, buttons, fingers or fasteners to attach the discs 233, 234 to the receptacles 68, 69. In an embodiment, the mounting arm assembly 1 can be provided to the end user with a series of different sizes of sizing discs 231-234, in order to accommodate different diameter rods provided in different makes of vehicles. For example, rods 61, 62 having a diameter of ⅜ of an inch can have one set of sizing discs 231-234 and rods 61, 62 having a diameter of a ½ inch can another set of sizing discs 231-234. In a further embodiment for example, the aperture 123 may be sized to receive rods 61, 62 having ½ inch diameters and sizing discs 231-234 may be provided for headrests having rods 61, 62 having ⅜ inch diameters. Such ⅜ inch diameter sizing discs 231-234 may be formed in order to be received by and adapt the ½ inch aperture 123 to receive smaller rods 61, 62.

Once the lower sizing discs 233, 234 are mounted to the receptacles 68, 69, each wing 235 may be oriented transverse to the aperture 123 for support. The arm 50 is then placed over the lower discs 233, 234. Upper sizing discs 231, 232 may then be mounted to the lower sizing discs 233, 234. Each upper sizing disc 231, 232 may have an attachment sleeve 236 that is received in the aperture 233a, 234a of the lower sizing disc 233, 234. Other means of attaching the upper and lower discs 231-234 may also be provided such as détentes, buttons, fingers or fasteners. Each upper sizing member 231, 232 also includes an enlarged diameter neck 237 that supports the sleeve above the aperture 123 into which each disc 231, 232 is received. The rods 61, 62 (corresponding to the predetermined sized sizing disc 231-234) are then slid through the upper sizing discs 231, 232, through the aperture 123, through the lower sizing discs 233, 234 and into the receptacles 68, 69 of the seat-back 70. For example, if the rods 61, 62 are ⅜ inch in diameter and are being used with an arm 50 having a ½ inch aperture; the upper sizing discs 231, 232 have inner diameters of approximately ⅜ inch. The diameter of the outer walls of the attachment sleeve 236, in an embodiment, is ⅛ inch. Thus, the sizing member 231, 232 acts to fill the gap between the oversized aperture 123 of the arm 50 and the undersized rods 61, 62.

It is also to be understood that the sizing discs 231-234 act to provide a vertical securement means for the arm 50 at well. By attachment of the upper discs 231, 232 to the lower discs 233, 234 and clamping of the arm 50 between the neck 237 and the wings 235 of each disc 231-234, the arm 50 is secured in a vertical position on the rods 61, 62. Due to the connection of the lower disc 233, 234 to the receptacles 68, 69. Thus, although a great amount of weight may be placed on the platform 10, such as a laptop computer, the securement discs 231-234 can counteract the weight at the opposite end and maintain the platform 10 and arm 50 in a horizontal orientation.

In a further embodiment, the discs 231-234 may be used without removing the headrest of a vehicle from the seat-back. As shown in FIG. 9, the upper disc 231 may be formed with a slot 240 so that the slot 240 bisects the longitudinal axis of each of the discs. In an embodiment, the disc 231 may be formed of an elastic material that allows the slot 240 to expand so that it may be snap-fit around a rod 61. Likewise, a slot 241 may be provided in the lower disc 233 so that it may be snap-fit around the rod 61 adjacent the receptacle 68. Each disc 231, 233 is formed with an appropriately sized inner diameter, so that after snap-fitting around the rod 61 it may slide vertically up and down the rod 61. Thus, after sliding the aperture 123 of the arm 50 around the rods 61, 62 in order to place the arm 50 on the top of the seat-back 70, the discs 231, 233 may be clamped together as discussed above in order to provide the sizing and securement function.

Also with respect to FIG. 9, a tether member 250 is depicted that provides additional means of securing the arm 50 to the seat-back or upright member 70. In an embodiment, a flexible cord 251, such as a bungee cord, is attached to the arm 50. A terminal end 252 is provided having a biasing tube 254 having an opening 259 for receiving the cord therethrough. The tube 254 includes a bias structure or spring 255 that biases a piston 256 having an opening 257 and a button 258. After mounting the arm 50 to the rods 61, 62 and the seat-back or upright member 70, the cord 251 is stretched around the rod 62 (either above or below the arm 50) and the tube 254 is mounted in a gap 260 formed in a side of the arm 50. In an embodiment, the gap 260 may have resilient fingers 261, 262 formed therein in order to grasp the outer sides of the tube 254. For example, the fingers 261, 262 may be bowed inward so that a friction fit is provided when the tube 254 is slid therebetween. Other fasteners or securement means may be provided to attach the tube 254 to the arm 50.

Once the tube 254 is secured to the arm 50, the button 258 on the tube 254 is depressed so that the opening 257 of the piston 256 aligns with an opening 259 formed in the tube 254 in order to release the cord 251. The cord 251 is then pulled through the openings 257, 259 and is pulled taught against the rod 62. The button 258 is then released so that the piston 256 is pushed upward to close the opening 257 on the cord 252 so that it becomes trapped and pinned against the opening 259 of the tube 254. As shown in FIG. 9, the gap 260 is located on the arm 50 away from the end so that the rod 62 is located between the gap 260 on a first side 181 and the attachment point of the cord 251 on the second side 182 of the arm 50. Thus, when the cord 251 is pulled taught it must abut against the rod 61. In this way the tether member 250 acts to secure the arm 50 to the seat-back 70 and prevents the arm 50 from sliding out toward the center of the vehicle, in the direction of arrow X, and off of the rods 61, 62. A tether member 250 may have alternate arrangements and components that provide for the securement of the arm 50 to the upright member 70.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the claims when viewed in their proper perspective based on the prior art.

What is claimed is:

1. An arm for mounting an electronic component comprising:

an arm including a longitudinal axis, *the longitudinal axis bisecting the arm* and [a] *an oblong* mounting aperture formed [along] *in the arm on* the longitudinal axis *and an opening formed in the arm in communication with the oblong mounting aperture*;

a support area for receiving the electronic component thereon, *the electronic component having a display screen,* the support area attached to the arm;

an attachment member for fastening at least a portion of the electronic component to the support area in a generally horizontal orientation *and the support area is pivotally attached to the arm to re-orient the position of the support area with respect to the arm*;

*a fastener disposed on the arm at a first side;*

*a pair of rods extending from a support surface;*

*the arm for attaching to the pair of rods extending from the support surface of* an upright member having [a rod] *the rods* that [extends] *extend* from [a] *the* support surface, *the pair of rods oriented in-line with the longitudinal axis of the arm and the support area, the longitudinal axis extending parallel to a long side of the arm so that the support area is generally positioned in-line or parallel with the longitudinal axis and the support area oriented at a second side of the arm, opposite the first side*; and the arm mounted on the support surface [so that the rod of the upright member] *and at least one rod of the pair of rods is capable of being received through the opening and* is disposed inside the mounting aperture *and the fastener clamping the rod within the mounting aperture to restrict lateral movement of arm with respect to the mounting aperture; and*

*the arm substantially one-piece and the mounting aperture having a generally U-shape and the arm mounted to the support area and receiving a rod and the generally U-shape substantially maintained by the mounting aperture and the fastener latching the rod within the arm.*

2. The mounting arm of claim 1 wherein the mounting aperture is integrally formed within the arm.

3. The mounting arm of claim 1 [wherein the upright member comprises], *further comprising:*

*the pair of rods supporting* a head rest [mounted to] *disposed above* the support surface including a seat back *and the arm mounted to at least one of the pair of rods.*

4. The mounting arm of claim 3 wherein the head rest includes [a] *the* pair of rods protruding therefrom and [at least one] *each* of the rods received by the aperture provided by the arm [and the rod removeably inserted in at least one hole in the support surface].

5. The mounting arm of claim 1 wherein the attachment member includes [a Velcro strap attached to the support area] *one of an elastic strap having hook and loop fasteners, Velcro® straps, clips, clamps, fingers, magnet, ropes, strings, bungee cords, clamping boards, and hooks.*

[6. The mounting arm of claim 1 wherein the arm includes a telescoping arm extension.]

[7. The mounting arm of claim 1 wherein the support area includes a clamping member for clamping an electronic component to the support area.]

8. The mounting arm of claim 1 wherein the support area includes a rim protruding from the support area and having a void for receiving a cord of the electronic component.

9. The mounting arm of claim 1 wherein the [attachment member] *fastener* includes [an offset member] *a latch finger.*

10. [The] *A* mounting arm [of claim 9] *comprising:*

*an arm including a longitudinal axis and an oblong mounting aperture formed along the longitudinal axis and an opening formed in the arm in communication with the oblong mounting aperture;*

*a support area for receiving the electronic component thereon, the electronic component having a display screen, the support area attached to the arm;*

*an attachment member for fastening at least a portion of the electronic component to the support area and the*

*support area is pivotally attached to the arm to re-orient the position of the support area with respect to the arm;*

*a fastener disposed on the arm;*

*a pair of rods extending from a support surface;*

*the arm for attaching to the pair of rods extending from the support surface of an upright member having the rods that extend from the support surface; and*

*the arm mounted on the support surface and at least one rod of the pair of rods is capable of being received through the opening and is disposed inside the mounting aperture and the fastener clamping the rod within the mounting aperture to restrict lateral movement of arm with respect to the mounting aperture;* wherein the [offset member] *fastener* includes a resilient band attached to the [attachment member] *arm* in order to [form a gap between the attachment member and an upper surface of the electronic component] *pull a first side of the arm toward a second side of the arm.*

11. The mounting arm of claim 10 wherein the [adjustable] arm includes a swivel joint disposed adjacent the arm.

12. The mounting arm of claim 1 further comprising an adjustable arm disposed between the arm and the support area for adjusting the angle of the arm *or the support area*.

13. The mounting arm of claim 1 wherein the support area is hingedly attached to the arm.

14. The mounting arm of claim 1 wherein the mounting aperture is open on a side and allows [for a] *the* rod to be slid [therein] *within the mounting aperture*.

15. The mounting arm of claim 14 wherein *the fastener comprises* a latch [finger] *member that* is located at the opening of the aperture [in order to], *the latch member to* retain the rod within the aperture.

[16. The mounting arm of claim 14 wherein a latch finger latches to a latch member disposed on the arm in order to retain the arm to the rod.]

17. The mounting arm of claim 1 wherein the support area is oriented horizontally with respect to the support surface.

[18. The mounting arm of claim 1 further comprising sizing members disposed on the rod for mounting the arm to the rod.]

[19. The mounting arm of claim 1 further comprising a tether member having a proximal end attached to the arm and having a biasing tube for attaching a terminal end of the tether member to the arm in order to lock the rod within the aperture of the arm.]

20. The mounting arm of claim 1 further comprising a second arm [mounted directly to the support surface].

[21. The mounting arm of claim 20 further comprising a third arm protruding from the support surface and connected to the platform.]

[22. The vehicle mount of claim 1 wherein a portion of the mounting aperture is offset from the longitudinal axis.]

23. A mounting apparatus comprising:

a support area *for receiving an electronic component*;

an arm *pivotally* attached to the support area, the arm having [a] *an oblong* mounting aperture having an opening on a side, *the mounting aperture formed in the arm on a longitudinal axis of the arm, the longitudinal axis bisecting the arm and extending parallel to a long side of the arm and the support area extending from the arm generally on the longitudinal axis*; and a support surface having a rod protruding therefrom and the arm supported by the support surface and the mounting aperture [for] receiving the rod through the open side and received within the aperture*; and*

*the arm substantially one-piece and the mounting aperture having a generally U-shape and the generally U-shape substantially maintained following the mounting of the arm to the support area and the fastener latching the rod within the arm.*

24. The mounting apparatus of claim 23 wherein the support surface has a clamping member mounted thereto and the arm is secured to the support surface by the clamping member.

25. The mounting apparatus of claim 24 wherein the clamping member comprises a headrest of a vehicle mounted to the support surface via the rod and by sliding of the rod into the support surface the headrest is positioned in order to [clap] *clamp* down onto the arm.

26. The mounting apparatus of claim 23 wherein the [mounting aperture] *arm* includes a [latch finger] *fastener* located at the opening of the mounting aperture [in order to retain the rod within the mounting aperture] *the opening formed at an end of the arm.*

27. A mounting apparatus comprising:

a support area *for receiving an electronic component*;

an arm *pivotally* attached to the support area, the arm having [a] *an oblong* mounting aperture having an open side, *the mounting aperture formed in the arm on a longitudinal axis of the arm, the longitudinal axis bisecting the arm and extending parallel to a long side of the arm and the support area extending from the arm generally on the longitudinal axis and the support area disposed opposite the open side*; [and]

a support surface having a rod protruding therefrom and the arm supported by the support surface and the mounting aperture for receiving the rod *received* through the open side and a [latch finger] *fastener* located at the open side *and having a latching action* in order to retain the rod within the mounting aperture*; and*

*the arm substantially one-piece and the mounting aperture having a generally U-shape and the arm mounted to the support area and receiving a rod and the generally U-shape substantially maintained by the mounting aperture and the fastener latching the rod within the arm.*

28. The mounting apparatus of claim 27 wherein the [latch finger is a hook shaped finger that engages the rod] *open side is formed on the longitudinal axis.*

29. The mounting apparatus of claim 27 wherein the [latch finger] *fastener* partially encloses the open side.

30. A vehicle mount for mounting an electronic component to a seat of a vehicle comprising:

an arm including [a] *an oblong* mounting aperture formed within the arm *on a longitudinal axis and a fastener disposed on the arm, the mounting aperture having a generally U-shape*;

a support area for receiving the electronic component thereon, the support area attached to the arm *and the support area extending from the arm generally on the longitudinal axis of the arm, the longitudinal axis bisecting the arm and extending parallel to a long side of the arm*;

an attachment member for fastening at least a portion of the electronic component to the support area;

a headrest of the vehicle having a rod that extends from a support surface of a seat back;

the arm *substantially one-piece and the generally U-shape mounting aperture substantially maintained when the arm is* mounted on the support surface so that the rod of the [upright member] *support surface* is disposed within the mounting aperture *and receives the rod*; and the arm is adjustably connected to the support area in order to provide for adjusting of the angle of the arm with respect to the support area*, or for adjusting the angle of the support area with respect to the arm*.

31. The vehicle mount of claim 30 wherein the arm is pivotally mounted to the support area.

32. The vehicle mount of claim 30 wherein the attachment member secures the electronic component to the support area so that a display monitor of the electronic component is oriented in a vertical orientation in the final mounted position.

33. The vehicle mount of claim 30 wherein [the electronic component is a DVD player and the vehicle includes a first seat back oriented adjacent a second seat back and a center area formed between the first and second seat backs and the arm extending toward the center area from the first seat back and the support area disposed in the center area so that multiple occupants of the vehicle located behind the first and second seat backs may easily view the DVD player mounted to support area] *the fastener latching an open side of the mounting aperture to retain the rod within the arm*.

34. The vehicle mount of claim [33 further comprising a second arm extending from the support area and the second arm attached to the second seat back] *30 wherein the aperture extends toward an end of the arm and the fastener is disposed at the end of the arm*.

35. The vehicle mount of claim 30 wherein [the arm is a coiled, flexible snake-like tube] *the mounting aperture having an open side that is formed on the longitudinal axis*.

*36. A mounting apparatus comprising:*

*a support area for receiving an electronic component;*

*an arm pivotally attached to the support area and a support surface having a rod protruding therefrom, the support surface for supporting the arm, the arm having an oblong mounting aperture for receiving a rod and the arm having an opening on a side, the mounting aperture formed in the arm on a longitudinal axis of the arm and the support area extending from the arm generally on the longitudinal axis, the longitudinal axis bisecting the arm and extending parallel to a long side of the arm and the support area disposed opposite the open side;*

*the mounting aperture capable of receiving a rod through the open side and received within the aperture, the open side of the mounting aperture at least partially blocked by a fastener having a latching action capable of retaining the rod within the mounting aperture; and*

*the arm substantially one-piece and the mounting aperture having a generally U-shape and the arm mounted to the support area and receiving a rod and the generally U-shape substantially maintained by the mounting aperture and the fastener latching the rod within the arm.*

*37. The mounting apparatus of claim 36 wherein the aperture extends toward an end of the arm and the fastener is disposed at the end of the arm.*

* * * * *